Sept. 26, 1967 A. L. FREEDLANDER ET AL 3,343,354
FLEXIBLE LAWN MOWER BLADE
Filed Oct. 24, 1966
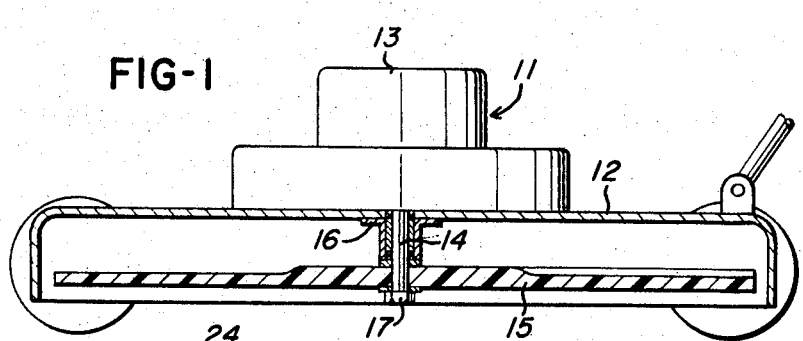
FIG-1
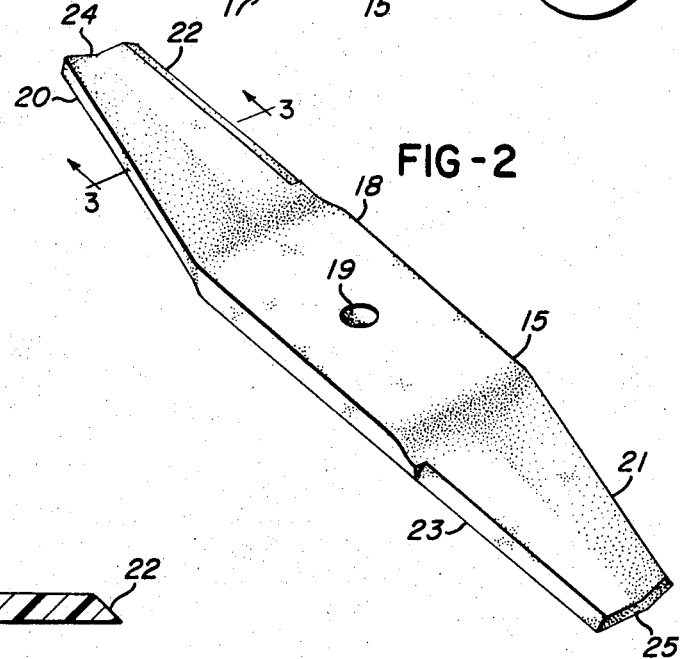
FIG-2
FIG-3
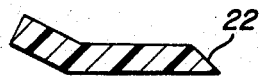
FIG-4
INVENTORS
ABRAHAM L. FREEDLANDER
WAYNE C. GARRETT
ROBERT E. MATTHEWS
BY
  Reuben Wolk
        ATTORNEY 3,343,354
FLEXIBLE LAWN MOWER BLADE
Abraham L. Freedlander, Dayton, Ohio, and Robert E. Matthews and Wayne C. Garrett, Waynesville, N.C., assignors to Dayco Corporation, Dayton, Ohio, a corporation of Delaware
Filed Oct. 24, 1966, Ser. No. 589,109
3 Claims. (Cl. 56—295)

ABSTRACT OF THE DISCLOSURE

A flexible elastomeric safety lawn mower blade for a power driven rotary lawn mower. The blade is made of a material such as a urethane elastomer, which permits it to flex when striking a shoe or other object. In addition, the upper surface of the blade has an upwardly facing obtuse angle which creates air turbulence to hold up the grass for cutting and improve ejection of the cuttings.

Conventional lawn mowers used by the average homeowner are usually rotary and are gasoline or electric motor operated. This type of mower is also popular for industrial mowing operations. The term "rotary" refers to a mower in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and weeds. Unfortunately, however, the extremely high speeds at which such mowers operate, up to 3600 r.p.m., cause the blades to create extremely high hazards. For example, there have been many cases known where the operator's foot has accidentally slipped under the housing and has been struck by the rotating blade, causing serious injury to, and even amputation of, the foot. In addition, the conventional metal cutting blade may strike large rocks, posts, or other objects in the lawn, and the sudden shock may cause the blade to break, hurling pieces of metal at tremendous speeds to cause injury to the operator or to the persons close by. In the case of loose stones and other obstructions, these objects are also often struck by a rigid metal blade and caused to be thrown great distances to create damage to persons or property. A further disadvantage of the conventional metal blade used in the rotary mower is that it becomes dull very quickly and must be resharpened for proper efficiency.

The present invention is designed to overcome the many disadvantages recited above, while at the same time retaining the advantages of the rotary type blade. The invention utilizes a blade having arms somewhat similar to those of a metal blade, but made of an elastomeric material that is sufficiently rigid to cut grass as efficiently as a metal blade, and yet sufficiently flexible to permit the blade to flex when striking an object such as a shoe. This flexing action permits the blade to ride over the object and thus avoid serious damage to the foot. This flexing is also useful if an immovable object, such as a large rock or post, is encountered, since the blade is still permitted to flex and ride over this object; at the same time, the blade has a certain amount of inherent elasticity that tends to cushion the initial shock and prevent the blade from breaking. In the case of small rocks, etc. the flexing action will somewhat cushion the initial impact and reduce the amount of speed at which these small objects are hurled. The novel blade also has the property of being able to flex repeatedly without destroying any of its properties, and also retains a cutting edge a remarkably long time. The material utilized also has the properties of elongating only a very small amount during operation and yet has sufficient elastic memory to return to its original size despite many hours of use. Despite the fact that it is elastomeric, the blade itself does not get softer during operation, but retains its initial properties that provide an excellent compromise between sufficient rigidity for cutting and sufficient flexibility for safety. The blade is also extremely simple to manufacture and very low in cost.

In our application Ser. No. 579,304 filed Sept. 14, 1966, we have described an invention relating to a blade formed of a nonreinforced homogeneous flexible elastomeric material. The present invention relates to a somewhat different form of this blade which has additional properties of flexibility and is formed differently. In addition, the blade of the present invention is designed to create a blast of air in an upward direction so that the grass immediately ahead of the cutting edge is pulled straight up, and thus renders the blades of grass easier to cut. The same feature of this design also creates considerable air turbulence which, therefore, tends to throw the grass outward through the exit chute or into a container which may be mounted on the mower and attached to the exit chute so that these blades will be caught, if so preferred by the operator. This is accomplished by forming the upper surface of the cutting portion of the blade in a special manner which is described below, in order to create the desirable results.

It is, therefore, a principal object of this invention to provide a lawn mower blade that minimizes the possibility of personal injury.

It is a further object to provide such a blade which is inexpensive and simple to manufacture.

It is a further object to provide a blade which causes the grass to stand up just before cutting and thereby simplifies the cutting process.

It is a further object to provide a blade which improves the tendency of the mower to throw the grass outward.

It is still another object of the invention to provide a blade which tends to slide over foreign objects rather than catching them up and throwing them out.

Other objects of the invention will be readily apparent in the following description and accompanying drawings, in which:

FIGURE 1 is a side elevational view of a typical lawn mower in partial section.

FIGURE 2 is a perspective view of a novel blade manufactured in accordance with the invention.

FIGURE 3 is a cross section of the blade taken along lines 3—3 of FIGURE 2.

FIGURE 4 is a view similar to FIGURE 3, illustrating another form of the invention.

Referring now to the drawings, FIGURE 1 illustrates a conventional lawn mower 11 having a housing 12 upon which is mounted a motor 13 and a shaft 14 extending downwardly through the housing. Mounted on the shaft is the blade 15 which is secured to the shaft by means of a bushing 16 and a nut 17.

The blade 15 as shown in FIGURE 2 is formed of a single layer of elastomeric material having a central mounting portion 18 which is rectangular in cross section, and having an aperture 19 in the center thereof for mounting purposes. This central portion has a maximum width extending for about half the length of the blade and maintaining the maximum width throughout that length. The blade then tapers inwardly toward its outer edges and terminates in the two arms 20 and 21, one edge of which provides a cutting surface. At this point the outer edges are approximately one-half the width of the central portion. The outermost portions of the arms which are designated by reference numerals 22 and 23 are beveled at one side as shown in FIGURE 3, thus providing a sharpened edge for cutting. It is also possible to provide a chisel point, if desired, so that the cutting edge is centrally located with respect to the cutting edge, or it is possible to bevel the sharpened arm in the direction oppositely from that shown. At the same time, each arm extends from the cutting edge in the form of a flat segment, parallel to the central mounting portion, and then angles upwardly toward the trailing edge. The resulting configuration of both upper and lower surfaces is that of an obtuse angle in which the surfaces are parallel. At the same time that the arms taper with respect to the width of the blade, they are also reduced in thickness from the maximum thickness of the central mounting portion 18 to the minimum thickness at the outermost tips 24 and 25. The arms are, of course, twisted in an opposite direction from each other so that in both cases the cutting edges 22 and 23 will be lower with respect to the central plane of the blade than are the trailing edges. By "central plane of the blade" is meant the longitudinal plane passing through the blade midway between the upper and lower surfaces of the central mounting portion.

In the United States Patent No. 3,133,398 issued to Tatum, the inventor also has suggested the use of a twisted elastomeric blade for cutting purposes, and has likened his blade to a propeller. Applicants' invention is considerably superior because of the angular surface of the cutting area which permits the entire blade to ride over an obstruction such as a shoe or rock, and also improves the grass throwing properties of the blade. In prior art devices, it was found necessary to utilize reinforcing means to provide structural integrity to an elastomeric blade. The present invention embodies a blade which maintains its integrity without reinforcement, by utilizing certain types of materials. A preferred material is a urethane elastomer of the type which is adapted to be cast and which is formulated from a polyester based isocyanate terminated prepolymer. This material is formed through a chain extension with selected polyols or other polyfunctional active hydrogen materials and has been found to provide the necessary physical and mechanical characteristics. The material may be used in a wide range from 90 Shore A to 70 Shore D and has the following characteristics:

Hardness, 90–95 A; 50–55 D; 65–70 D
Tensile strength, p.s.i., 4000–5000; 5000–6000; 3500–4500
Tear strength p.l.i., 300–400; 600–700; 500–650

A successful lawn mower blade should have a minimum of elongation, in order to reduce stress, minimize abrasion, reduce flutter, and prevent the blade from striking the housing. The material described above has a very low elongation; for example, a lawn mower blade 19 in. long has been found to elongate only ¾ in. during operation at 3600 r.p.m., thus providing an elongation of less than five percent. This material also has excellent elastic memory, so that the blade will always return to its initial length after conclusion of the operation. The blade manufactured of this material will thus have sufficient structural integrity to provide satisfactory grass cutting, and yet will have sufficient flexibility to yield when striking extraneous objects such as a shoe, a rock, or a post, and will both glide over the object and have a certain amount of cushioning effect so that neither the object nor the blade will be damaged. It is important to remember that this is accomplished without the use of any reinforcing materials whatsoever so that the blade is completely homogeneous. Of course, it is possible to add reinforcing materials such as fabric or cords, if extra stiffness is desired.

FIGURE 4 illustrates a modified form of the invention in which the blade has an upper surface as described above, but the lower surface is curved rather than being parallel to the upper surface. This configuration provides a slightly different cutting action which may be desirable when used with certain types of grass.

Other variations in the above forms are contemplated as being within the scope of this invention, since it has been found that a variation in the thickness or width of the blade or the shape of the curve will affect the flexibility and cutting properties of the blade. It should also be noted that while the present blade is described as being formed of a single homogeneous layer of material, it might also be formed of multiple layers which are permanently joined. It should also be noted that while the blades 15 and 26 are illustrated as having two arms, they could just as easily be formed of three, four or more arms if desired.

We claim:
1. In a lawn mower having a rotatable shaft, a cutting blade mounted on said shaft composed entirely of a non-reinforced flexible urethane elastomer, said blade having a central mounting portion and a plurality of outwardly extending arms forming cutting surfaces, the upper surfaces of said arms forming an upwardly facing obtuse angle.
2. The blade of claim 1 in which the lower surface of said arms is parallel to the upper surface thereof.
3. The blade of claim 1 in which the lower surface of said arms forms a smooth continuous arc.

References Cited

UNITED STATES PATENTS

| | | | |
|---|---|---|---|
| 2,799,985 | 7/1957 | Rosenberg | 56—295 |
| 2,854,807 | 10/1958 | Byler et al. | 56—295 |
| 2,891,369 | 6/1959 | Riety | 56—295 |
| 3,109,274 | 11/1963 | Sheppard | 56—295 |
| 3,156,082 | 11/1964 | Joyner | 56—295 |

ABRAHAM G. STONE, *Primary Examiner.*
ANTONIO F. GUIDA, *Examiner.*